з,388,963
Patented June 18, 1968

3,388,963
MODIFICATION OF WOOL WITH ACETIC ANHYDRIDE AND PARAFORMALDEHYDE
Nathan H. Koenig, Berkeley, Calif., assignor to the United States of America as represented by the Secretary of Agriculture
No Drawing. Filed Oct. 29, 1964, Ser. No. 407,588
2 Claims. (Cl. 8—127.6)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool. In particular, the invention concerns and has as its prime object the provision of novel processes wherein wool is chemically modified by reacting it with a mixture of acetic anhydride and paraformaldehyde. Further objects of the invention will be apparent from the following description wherein parts and percentages are by weight unless otherwise specified.

Although wool is a very useful fiber it is often desirable to improve its properties for particular applications by chemically modifying it. Various compounds have been proposed for reaction with wool to produce modified fibers. It is known, for example, that wool can be chemically modified by reacting it with acetic anhydride. It is also known that wool can be chemically modified by reacting it with formaldehyde.

I have found that when wool is reacted with a mixture containing both acetic anhydride and paraformaldehyde, superior results are attained as compared with the reaction of wool with the individual compounds. A primary advantage of the process of the invention is that it yields an unexpectedly high degree of modification of the wool. This unusual result of the invention is demonstrated by the following comparative experiments:

Example I (a) Reaction of wool with a mixture of acetic anhydride and paraformaldehyde:

Dry wool cloth (1.2 g.), acetic anhydride (5 ml.) and paraformaldehyde (0.8 g.) were heated at 105° C. for 35 minutes. The treated wool was successively extracted with warm acetone and hot ethanol to remove unreacted reagents, then dried. It was found that the increase in the weight of the wool, due to its combination with acetic anhydride and paraformaldehyde, was 28%.

(b) Reaction of wool with acetic anhydride:

Dry wool cloth (1.2 g.) and acetic anhydride (5 ml.) were heated at 105° C. for 35 minutes. The wool was extracted as described in Part (a) and dried. It was found that the increase in weight of the wool was 11%.

(c) Reaction of wool with paraformaldehyde:

Dry wool cloth (1.2 g.) and paraformaldehyde (0.8 g.) were heated at 105° C. for 35 minutes. The wool was extracted as described in Part (a) and dried. The increase in the weight of the wool was 4%.

The above results are summarized below:

| | Reagents used | | Increase in weight of wool, percent |
|---|---|---|---|
| | Acetic anhydride | Paraformaldehyde | |
| Run: | | | |
| a | Yes | Yes | 28 |
| b | Yes | No | 11 |
| c | No | Yes | 4 |

It is evident from the above data that the process of the invention achieves a degree of modification which is far greater than the expected additive effect. In other words, by employing a mixture containing both the acetic anhydride and paraformaldehyde I obtain a synergistic effect. Since the process of the invention yields wools of an enhanced degree of modification as compared with those prepared under comparable conditions with acetic anhydride or paraformaldehyde alone, it has the practical advantage of yielding products which exhibit greater resistance to deleterious agents or influences, such as bleaching agents, oxidizing environments, laundering media, etc. Another advantage of the process is that the improvement is essentially permanent; the treated materials do not lose their new properties after long use or cleaning but retain these properties for the life of the material.

Carrying out the process of the invention essentially involves contacting wool with a mixture of acetic anhydride and paraformaldehyde. The reaction conditions such as proportion of reagents, time, temperature, etc. are not critical and may be varied to suit individual circumstances without changing the basic nature of the invention. The acetic anhydride is generally employed in excess over the amount desired to be taken up by the fiber. In fact, sufficient acetic anhydride is usually used to completely wet out the wool, thereby achieving a uniform treatment. For this reason it is preferred to employ the acetic anhydride in an amount of at least 100%, based on the weight of the wool. The paraformaldehyde is generally employed in a proportion of about from 10 to 100%, based on the weight of the wool. The temperature of reaction may be from 25 to 125° C. The reaction rate is increased with increasing temperature and a preferred range to expedite the reaction, yet without damaging the wool, is 90–110° C. It is preferred to carry out the reaction under anhydrous conditions, thereby to ensure reaction of the wool with the modifying agents, acetic anhydride and paraformaldehyde, and to avoid side reactions such as hydrolysis of the acetic anhydride. The degree of modification of the wool is influenced by the proportion of modifying agents taken up by the fiber, that is, the higher the uptake of acetic anhydride and paraformaldehyde, the greater will be the degree of modification of the wool. In general, the uptake of acetic anhydride and paraformaldehyde may be varied from 1 to 30%. The time of reaction will vary depending on such factors as the proportion of modifying agents, temperature of reaction, and the degree of modification desired. In general, the reaction may take anywhere from several minutes to several hours.

After reaction of the wool with the mixture of acetic anhydride and paraformaldehyde, the chemically modified wool is treated to remove excess reagents and diluent, if such is used. Thus the wool may be treated as by wringing, passage through squeeze rolls, centrifugation, or the like. In place of such mechanical action, or in addition thereto, the modified wool product may be extracted with a solvent such as trichloroethylene, benzene, acetone, ethanol, carbon tetrachloride, etc. Successive extractions with different solvent may be applied to ensure complete removal of all unreacted materials. The treated wool is then dried in the usual way.

Wool modified in accordance with the invention exhibits advantageous properties over normal wool. For example, the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to alkaline oxidizing conditions has been shown by exposing normal and modified wool samples to solutions of sodium hypochlorite, the active ingredient in commercial bleaches. In addition, increased resistance to acidic oxidation has been shown by the lowered solubility of the modified wool in the peracetic acid-ammonia test described hereinbelow.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate that actual chemical combination of the wool with the acetic anhydride and paraformaldehyde has taken place, it is not known for certain how these chemicals are united with the wool. It is believed, however, that the acetic anhydride and paraformaldehyde react with some of the sites on the wool molecule where there are reactive hydrogen atoms, e.g., amino, imidazoyl, and phenolic groups. Also, combination of the reactants with the wool may establish cross-links in or between the chains of the wool protein molecules that further increase the resistance of the fibers to chemical attack. It may be, however, that other reactions occur and it is not intended to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The invention is demonstrated by Example I, above, and by the following illustrative examples:

Example II

A 1.2-gram of dry wool cloth was heated with 5 ml. of acetic anhydride and 0.5 gram of paraformaldehyde for 45 minutes at 105° C. The treated wool was washed in warm acetone while applying a rubbing action, then extracted with ethanol overnight in a Soxhlet apparatus. After the cloth was dried it was found that the increase in the weight of the wool, due to its combination with the acetic anhydride and paraformaldehyde, was 24%.

The laundering shrinkage of the treated wool, along with a comparison sample of untreated wool, was determined by the following test:

Measured fabric samples were violently agitated in an "Accelerotor" at 1700 r.p.m. for 6 minutes at 40–42° C. with 0.9% sodium oleate solution, using a liquor-to-wool ratio of 50 to 1. After this washing operation, the samples were remeasured to determine the area shrinkage. The improvement in shrinkage properties of wool modified in accordance with the invention is demonstrated by the following data.

| Sample: | Area shrinkage, percent |
|---|---|
| Treated wool | 6 |
| Untreated wool | 45 |

Example III

A 1.2-gram sample of dry wool cloth was heated with 7 ml. of acetic anhydride and 0.7 gram of paraformaldehyde for 60 minutes at 105° C. The treated wool was extracted as in Example II, and dried. The increase in the weight of the wool was 24%.

The resistance to sodium hypochlorite of the treated wool, along with a comparison sample of untreated wool, was determined by the following test:

A 2-cm. length of yarn was removed from the fabric and placed in a 50-ml. beaker containing 20 ml. of 3% aqueous sodium hypochlorite. The liquid was stirred magnetically until the yarn had dissolved and the elapsed time was noted. The results tabulated below show the increased resistance to sodium hypochlorite of wool modified in accordance with the invention.

| Sample: | Time to dissolve yarn, min. |
|---|---|
| Treated wool | 30 |
| Untreated wool | 3 |

Example IV

A 1.2-gram sample of dry wool cloth was heated with 5 ml. of acetic anhydride and 0.5 gram of paraformaldehyde for 90 minutes at 75° C. The treated wool was extracted as in Example II, and dried. The increase in the weight of the wool was 23%.

The resistance to peracetic acid oxidation of the treated wool, along with a comparison sample of untreated wool, was determined by the following test:

A 0.4-gram sample of cloth is exposed for 24 hours to 100 ml. of 2% peracetic acid. The sample is filtered and then exposed to 100 ml. of 0.3% ammonium hydroxide. The loss in weight of the sample is determined after filtering it and drying it. The results tabulated below show the increased resistance to peracetic acid oxidation of wool modified in accordance with the invention.

| Sample: | Loss in sample weight, percent |
|---|---|
| Treated wool | 25 |
| Untreated wool | 85 |

Having thus described the invention, I claim:

1. A process for chemically modifying wool which comprises reacting wool under anhydrous conditions with a mixture of acetic anhydride and paraformaldehyde.

2. A process for chemically modifying wool which comprises reacting wool under anhydrous conditions with a mixture containing at least 100 percent by weight of acetic anhydride and about from 10 to 100 percent by weight of paraformaldehyde, said percentages being based on the weight of wool.

No references cited.

NORMAN G. TORCHIN, *Primary Examiner.*

J. C. CANNON, *Assistant Examiner.*